United States Patent Office 3,829,457
Patented Aug. 13, 1974

3,829,457
PROCESS FOR THE PRODUCTION OF ALKYL-SULFURIC ACIDS AND CORRESPONDING SALTS
Emilio Berrotti, Via Kennedy 2, San Donato Milanese, Italy, and Paolo Koch, Via Cavour 5, San Giuliano Milanese, Italy
No Drawing. Filed July 31, 1972, Ser. No. 276,466
Claims priority, application Italy, July 31, 1971, 27,013/71
Int. Cl. C07c 141/04
U.S. Cl. 260—459  9 Claims

ABSTRACT OF THE DISCLOSURE

The present invention refers to a process for the preparation of alkyl-sulfuric acids and corresponding salts starting from alcohols by a new sulfatation reaction with $O_2$ and $SO_2$ in the presence of transition metal compounds as catalyst. Many sulfuric derivatives of primary alcohols are known which have the $OSO_3H$ group directly bound to the hydrophobic radical.

They form one of the more important classe of synthetic surfactants owing to their great use in many different fields. They can be used as detergents, foaming agents, imbibition agents, dispersing agents and emulsioning agents.

Said products have been obtained by using different sulfonating agents which, however, presents serious drawbacks.

For instance concentrated sulfuric acid has been used in a big excess to eliminate the water formed in the reaction which causes the production of decomposition products depreciating the products; and big amount of inorganic salts in the neutralization requiring too expensive purification operations and whose presence greatly limitates the field of applications.

The normal continuous and batch processes preferably are directed to the use of chlorosulfuric acid employed as a small excess. However the process is very expensive owing to high cost of the sulfonating agent, it requires internally vitrified reactors, vacuum devices and $CO_2$ atmosphere.

Other sulfonating agents usefully employable are amino-sulfuric acid and sulfuric anhydride which allow to obtain high purity products. Both present however some of the above-mentioned drawbacks, as for instance the high cost of the first and the dangerous properties of the second which remarkably affect the costs of the plants. Moreover beside the desired product a big amount of di-alkyl sulfates is obtained.

It has been now found a process, and this is an object of the present invention, which allows to obtain alkylsulfate from alcohols, by a simple and economical method.

Said process consists in a reaction of an alcohol and sulfur dioxide, carried out in the presence of oxygen and by employing, as catalysts, complexes and salts of transition metals.

The reaction of the process according to the present invention can be schematically represented in the following way:

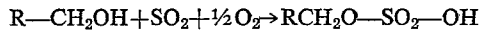

wherein R represents a hydrocarbon chain.

The reaction proceeds toward the formation of the monoalkylsulfate of the metal employed as catalyst.

The more complexes in this reaction are the ones of the metals belonging to VIII group and I subgroup.

The copper complexes result particularly effective as to the selectivity and kinetics. Said compounds can be employed in form of salts, hydrated salts or complexes with organic ligands.

We have now found that the presence of organic or inorganic bases makes the process catalytic and in such a case the corresponding salts of the produced alkyl sulfonic acids are produced.

The more convenient bases can be the ones employed to complex the metal (pyridine, phenanthroline, piperidine, phenanthroline, piperidine, tert-amines) or even inorganic bases as sodium hydroxide, potassium hydroxide, barium hydroxide, ammonia.

The metering and injection of said bases into the reaction zone is carried out, according to the known procedure, depending on the kinetic corse of the reaction by using continuous controls by means of instrumental analysis. The bases are generally introduced in form of solution in the above alcohol and in such a way a continuous process is obtained.

The cuprous and cupric salts of the anions: $Cl^-$, $Br^-$, $I^-$, $ClO_4^-$, $SO_4^=$, $CH_3COO^-$, both as they are and in the hydrated form or complexed with nitrogen containing bases are particularly active in promoting the above reaction.

The initial oxidation sage of the metal is not important, provided the reaction medium is such to insure a continuous presence of the catalytic redox system $Cu(I)/Cu(II)$.

Said conditions are exactly complied according to the invention in that in the reaction medium the oxidizing ($O_2$) and the reducing ($SO_2$) agents are continuously introduced.

The reaction is advantageously carried out using the alcohol itself as a solvent. The process is of general application and can be used for a broad class of products having linear or branched chains of the general formula:

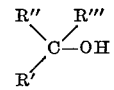

wherein $R'''$ is a linear or branched alkyl chain having 1 to 20 carbon atoms or phenyl; $R'$ and $R''$ can be H, alkyl or aryl radicals also complexed. One of the above-mentioned R radicals may comprise an ethereal bridge: in such a case the process can be extended to the polyethoxylated compounds which can be sulfatized, according to the invention, in the terminal hydroxyl group yielding polyethoxysulfate. The reaction conditions are not critical, obviously depending on the type of the employed alcohol, and must be such to keep in a liquid phase the reaction medium. Therefore the temperature and the pressure can be selected in a wide range respectively —100° C. to +100° C. and from some mm. Hg to 10 atmospheres; preferably the reaction is carried out at room temperature and atmospheric pressure the oxygen being fed at atmospheric pressure. Other operative characteristics will result from the following examples which are reported only to illustrate the invention but are not to be intended as limitative thereof.

EXAMPLE 1

10 mmoles CuCl have been reacted at 25° C. with $O_2$ at a pressure of 760 torr in 40 ml. of methanol containing 30 mmoles of $SO_2$ in 40 ml. of methanol containing 30 mmoles of $SO_2$ and 12.4 mmoles of pyridine. In the course of the reaction 25 mmoles of pyridine dissolved into 10 ml. of methanol were added thereto.

The reaction absorbs 16.4 mmoles of $O_2$ in about 15 minutes. At the end of the reaction the solution is deeply blue colored and by filtration 5 mmoles of $CuCl_2Py_2$ were recovered.

By adding 10 mmoles of pyridine hydrochloride to the solution all the copper present into the solution was removed in form of $CuCl_2Py_2$.

After addition to the solution of diethyl ether a solid was recovered consisting of a mixture of pyridine sulfate and monomethylsulfate. The amount of the above salt was determined by transforming the pyridine salt into the corresponding ammonium salts with ammonia in methanol solution. The insoluble diammonium sulfate was recovered by filtration, the soluble ammonium monomethyl sulfate was precipitated with ether. According to the above procedure 20 mmoles of $CH_3OSO_3NH_4$ and 5 mmoles of $(NH_4)_2SO_4$ were recovered.

EXAMPLE 2

8.6 mmoles of $CuCl_2 \cdot 2H_2O$ were reacted at 25° C. with $O_2$ at a pressure of 760 torr in 30 ml. of methanol containing 55 mmoles of $SO_2$ and 12.4 mmoles of pyridine. In the course of the reaction 60 mmoles of pyridine dissolved in 15 ml. of methanol were added thereto.

The reaction absorbs 29.8 mmoles of $O_2$ in about 15 minutes.

At the end of the reaction 8.5 mmoles of $CuCl_2Py_2$ were obtained; on the other hand, from the solution 37 mmoles of $CH_3OSO_3NH_4$ and 17.5 mmoles of $(NH_4)_2SO_4$ were recovered with a procedure according to example 1.

EXAMPLE 3

8.8 mmoles of $CuCl_2 \cdot 2H_2O$ were reacted at 25° C. with $O_2$ at a pressure of 760 torr in 30 ml. of butanol containing 55 mmoles of $SO_2$ and 12.4 mmoles of pyridine. In the course of the reaction 60 mmoles of pyridine dissolved into 15 ml. of butanol were added thereto.

The reaction absorbs 24 mmoles of $O_2$ in about 30 minutes. At the end 8.7 mmoles of $CuCl_2Py_2$ were obtained and on the other hand with a process similar to the one of example 1. 26.5 mmoles of ammonium n-butylsulfate and 18.5 mmoles of $(NH_4)_2SO_4$ were recovered.

What is claimed is:

1. A process for the production of alkylsulfuric acids and their corresponding salts comprising reacting an alcohol selected from the group consisting of methanol and butanol with sulfur dioxide in the presence of oxygen, an organic or inorganic base selected from the group consisting of sodium hydroxide, potassium hydroxide, barium hydroxide, ammonia, pyridine, phenanthroline, and piperidene, and a copper catalyst selected from the group consisting of a cuprous halide, a cupric halide, a cuprous acetate, a cupric acetate, a cuprous perchlorate, a cupric perchlorate, a cuprous sulfate and a cupric sulfate, said catalyst being the salt as such, its hydrate or its complex with pyridine, phenanthroline or piperidene, the reaction being carried out under a temperature of $-100°$ to $+100°$ C. and in the liquid phase.

2. The process according to Claim 1 wherein said copper catalyst is selected from the group consisting of a hydrated cupric halide, hydrated cupric acetate, hydrated cupric perchlorate, and hydrated cupric sulfate.

3. The process according to Claim 1 wherein the reaction takes place in the presence of an organic base selected from the group consisting of pyridine, piperidine, and phenanthroline.

4. The process according to Claim 1 wherein said alcohol further serves as a solvent medium for the reaction.

5. The process according to Claim 1 wherein the reaction is carried out at room temperature.

6. The process of Claim 1 wherein the reaction is carried out at room temperature and atmospheric pressure.

7. A process for the production of alkylsulfuric acids and their corresponding salts comprising reacting an alcohol selected from the group consisting of methanol and butanol with sulfur dioxide in the presence of oxygen, pyridine, and a copper catalyst selected from the group consisting of cuprous chloride, and hydrated cupric chloride, the reaction being carried out at room temperature and atmospheric pressure.

8. Thee process of Claim 7 wherein said alcohol is methanol and said copper catalyst is cuprous chloride.

9. The process of Claim 7 wherein said alcohol is butanol and said copper catalyst is hydrated cupric chloride.

References Cited

UNITED STATES PATENTS

| | | | |
|---|---|---|---|
| 2,037,028 | 4/1936 | Jaeger | 423—533 |
| 2,645,656 | 7/1953 | Oldham et al. | 260—459 |

FOREIGN PATENTS

| | | | |
|---|---|---|---|
| 219,651 | 4/1957 | Australia | 260—459 |
| 907,054 | 7/1949 | Germany | 260—459 |

OTHER REFERENCES

Gilbert: "Sulfonation and Related Reactions" (1965), pp. 131-136, 351, 352,

JOSEPH E. EVANS, Primary Examiner

U.S. Cl. X.R.

252—429 A; 260—290 HL, 458; 423—533

UNITED STATES PATENT OFFICE
CERTIFICATE OF CORRECTION

PATENT NO. : 3,829,457
DATED : August 13, 1974
INVENTOR(S) : Emilio Berrotti and Paolo Koch It is certified that error appears in the above-identified patent and that said Letters Patent are hereby corrected as shown below:

Column 1, line 23, correct spelling of "classes".

line 69, before "complexes" insert --active--.

Column 2, line 9, delete "phenanthroline, peperidine,"

line 24, change "sage" to --stage--.

Signed and Sealed this twenty-sixth Day of August 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,829,457
DATED : August 13, 1974
INVENTOR(S) : Emilio Perrotti and Paolo Koch It is certified that error appears in the above-identified patent and that said Letters Patent are hereby corrected as shown below:

Column 1, after the title, change the line to read

-- Emilio Perrotti, Via Kennedy 2, San

Donato Milanese, --.

Signed and Sealed this twenty-third Day of March 1976

[SEAL]

Attest:

RUTH C. MASON
Attesting Officer

C. MARSHALL DANN
Commissioner of Patents and Trademarks